INVENTORS
MORRIS WAYMAN and
WILLIAM H. RAPSON
BY Thomas E. Tate
AGENT

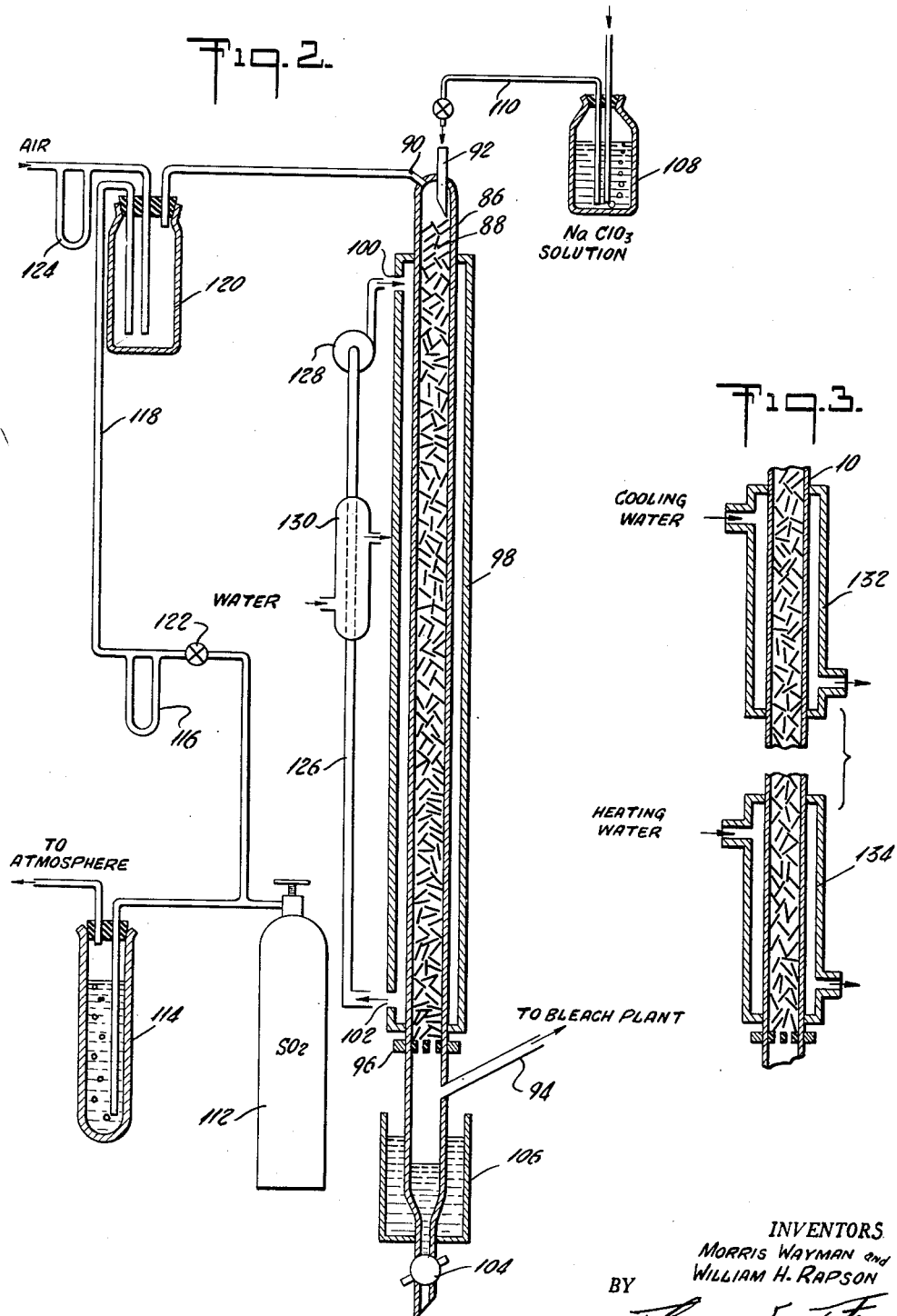

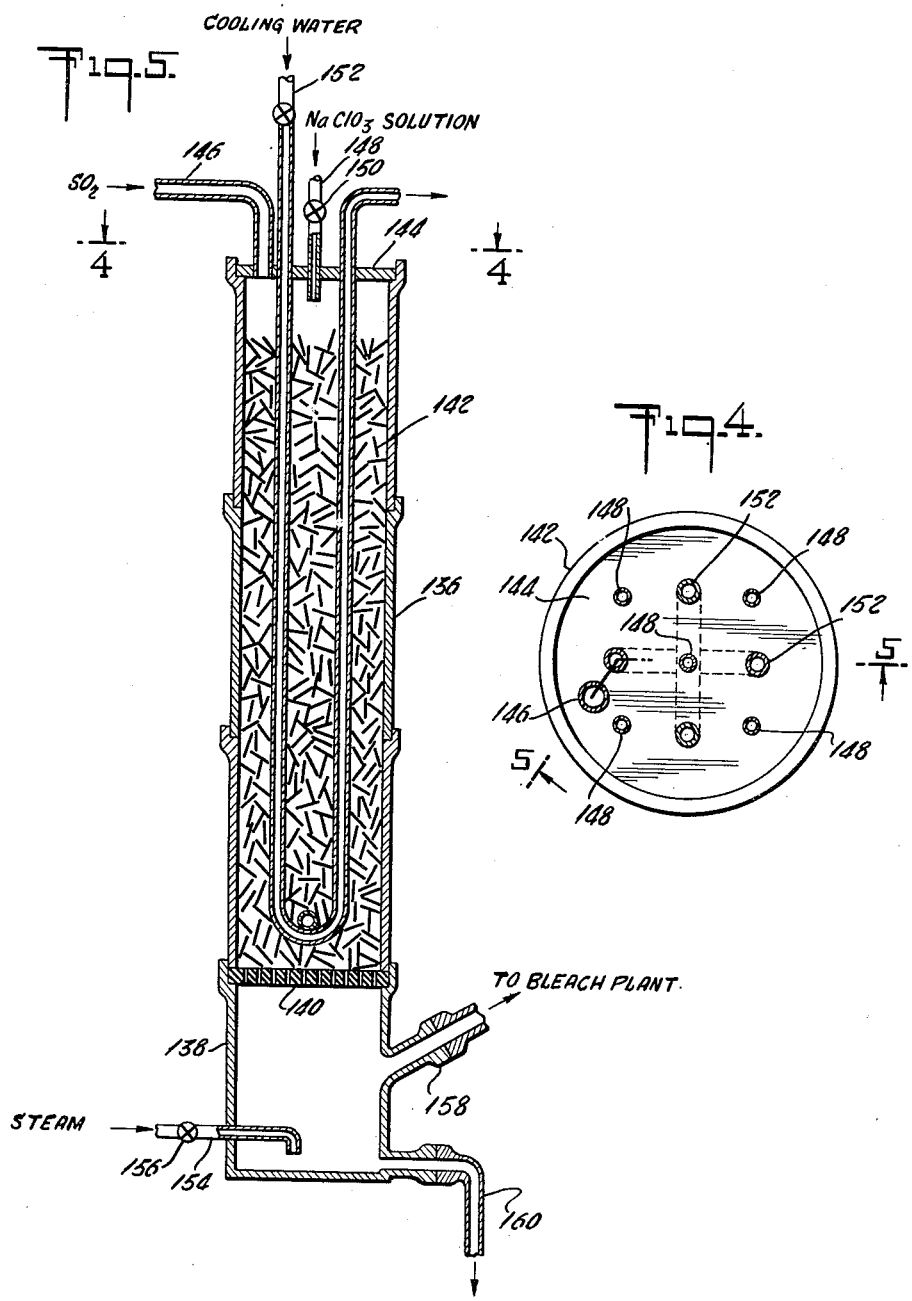

Patented May 27, 1952

2,598,087

UNITED STATES PATENT OFFICE 2,598,087

METHOD FOR PRODUCING CHLORINE DIOXIDE

Morris Wayman and William Howard Rapson, Hawkesbury, Ontario, Canada, assignors to Canadian International Paper Company, Montreal, Quebec, Canada, a corporation of the Province of Quebec Application June 2, 1949, Serial No. 96,716

5 Claims. (Cl. 23—152)

This invention relates to the manufacture of chlorine dioxide and more particularly to the manufacture of chlorine dioxide in a continuous process.

It is known that chlorine dioxide may be formed as a result of the reaction between sulphur dioxide and an aqueous solution of a chlorate, but all processes of which we are aware are batch processes which involve the bubbling of $SO_2$, preferably diluted with air or nitrogen or other inert gas, through a volume of chlorate solution in a suitable container from which the evolved chlorine dioxide may be removed. Obviously, in any such procedure the reaction between the gas and the chlorate occurs under progressively changing conditions. For example, the chlorate solution must become saturated with respect to chlorine dioxide before any of this gas will be evolved. Furthermore, the concentrations of the chlorate solution and the byproducts are subject to constant change throughout the operation.

When gaseous $SO_2$ is brought into contact with an aqueous solution of sodium chlorate, for example, a number of reactions occur. Chlorine dioxide is produced in accordance with the following equation:

(1) 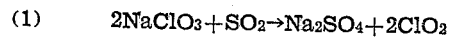

The chlorate is also reduced to chloride as follows:

(2) 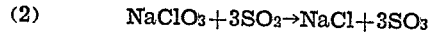

A number of side reactions occur which result in the production, among other things, of chlorine, sulphuric acid, hydrochloric acid and sodium acid sulphate.

Proper conditions may be established which favor the production of chlorine dioxide, but the other products will always occure to a greater or less extent. In the batch processes of the prior art it is clearly impossible to establish and maintain those conditions which are most favorable for the production of chlorine dioxide because of the constantly decreasing concentration of chlorate and the increasing concentration of other products, some of which favor the production of chlorine. Accordingly, it is not at all possible to convert substantially all of the chlorine available in the chlorate to the desired form.

In accordance with the present invention the apparatus and process enable us to produce chlorine dioxide in a continuous manner and to establish and maintain those conditions most favorable for the production of the greatest possible percentage of chlorine dioxide. A very much greater portion of the available chlorine is thus converted into chlorine dioxide and the cost of producing this valuable gas is very greatly reduced.

As a result of our invention it is possible to produce a continuous flow of chlorine dioxide at exactly the rate necessary for use of the gas in some continuous processing plant, as, for example, a pulp mill in which a continuous refining, bleaching or purifying process is in operation. In this latter connection chlorine dioxide has properties which would make it a valuable processing chemical in the production of high alpha pulp and high brightness, high strength paper pulp. However, because of its highly unstable nature and because it has heretofore been produced only in batches it has not been practicable to make use of this gas.

It is therefore an object of the present invention to provide apparatus and process for the continuous production of chlorine dioxide by the reaction between sulphur dioxide and an aqueous solution of a metallic chlorate.

Another object of this invention is to provide apparatus and process for the continuous production of chlorine dioxide wherein the reaction between sulphur dioxide and the aqueous solution of a metallic chlorate can be effected under either cocurrent or countercurrent conditions of flow.

Another object of this invention is to provide apparatus for the continuous production of chlorine dioxide which includes cooling means positioned internally within the reaction tower in such a manner that continuity of the packing within the tower is substantially uninterrupted.

With these and other objects in view, the nature of which will be more apparent, the invention will be more fully understood by reference to the drawings, the accompanying detailed description and the appended claims.

In the drawings,

Fig. 2 is a vertical section, partly schematic, of a form of reaction apparatus that may be employed under conditions of cocurrent flow;

Fig. 3 is a fragmentary vertical section of a reaction tower and shows a modified form of cooling and heating means that may be employed with the apparatus of either Fig. 1 or Fig. 2;

Fig. 4 is an enlarged top plan, partly in section, of a form of apparatus suitable for the production of large quantities of chlorine dioxide, and taken along line 4—4 of Fig. 5; and Fig. 5 is a vertical section, somewhat reduced, taken along line 5—5 of Fig. 4 and clearly illustrates one form of internally positioned cooling elements.

Figure 1:
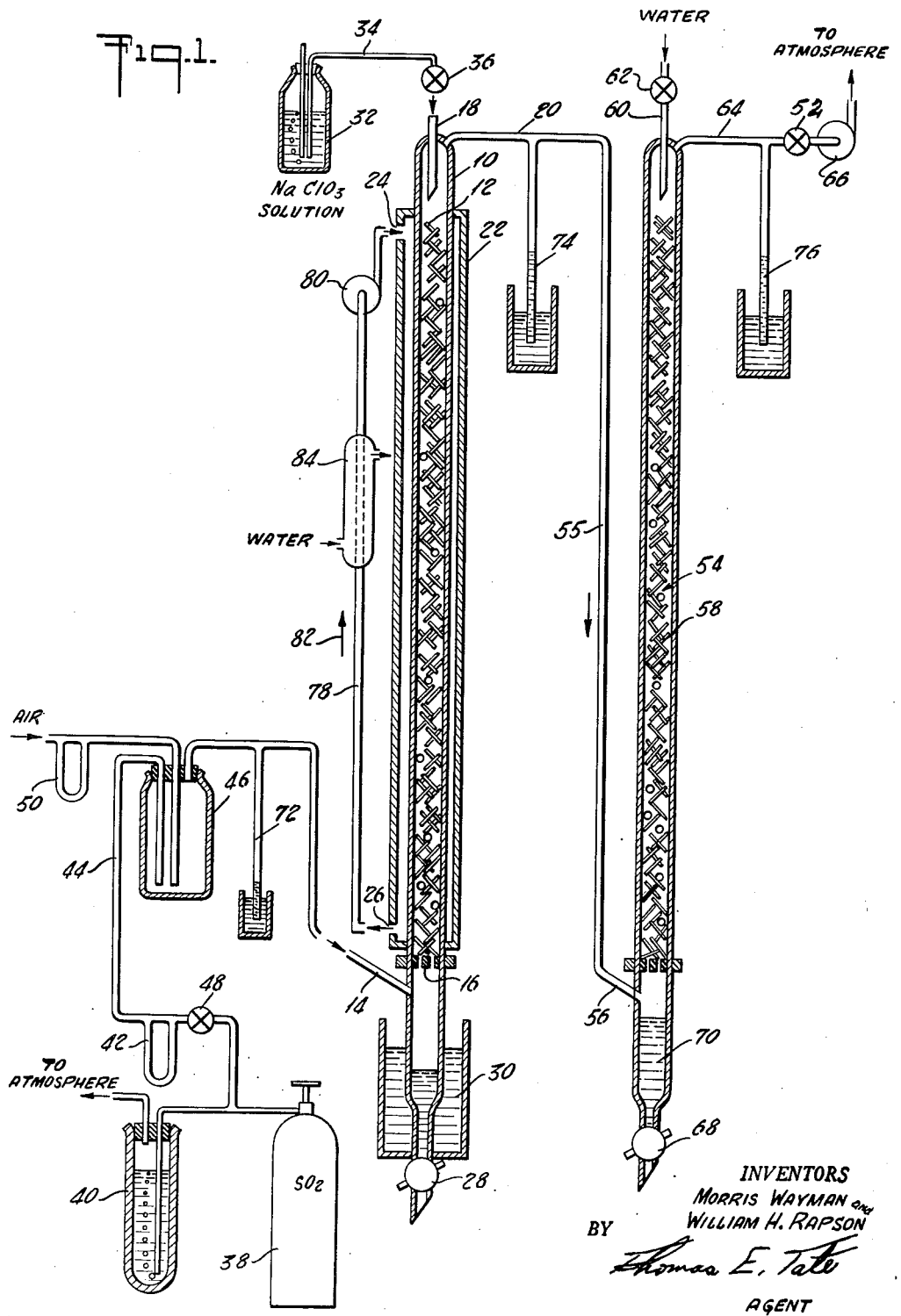
Fig. 1 is a vertical section, partly schematic, of one form of apparatus that may be employed under conditions of countercurrent flow.

This application is a continuation-in-part of our co-pending application Ser. No. 640,592, filed January 11, 1946, which has been issued as Patent No. 2,481,240.

We have found that chlorine dioxide may be produced continuously and efficiently from concentrated sodium chlorate solution and sulphur burner gas by passing these two reactants either countercurrently or cocurrently, through a tower packed with Raschig rings or other suitable packing. Of course, pure $SO_2$ suitably diluted with an inert diluent gas such as air can be used rather than sulphur burner gas, and in such cases the percentage of $SO_2$ may be adjusted to any desired value. The present process is believed to be the first in which a reactive gas is made to react with a solution in a packed column to produce another gas with which the original gas will react. In the present case the $SO_2$ is reactive with the chlorine dioxide and it would be thought that such reaction would render this process inoperative. However, we have found that when sodium chlorate solution is allowed to trickle down over the tower packing to expose an enormous surface of the thinly spread solution to the sulphur dioxide and air mixture, the sulphur dioxide reacts more rapidly with the chlorate than with the chlorine dioxide. Furthermore, we control the temperature in those portions of the tower where relatively high concentrations of sulphur dioxide and chlorine dioxide are mixed whereby to minimize the reaction between these gases.

Naturally there is a tendency in this apparatus toward the formation of chlorine and under certain conditions of operation, which in many instances may be the most desirable, the evolved gas will comprise a mixture of a relatively high percentage of chlorine dioxide, a relatively lower percentage of chlorine and a large percentage of diluent gas which may comprise air, or where sulphur burner gas is used, air and nitrogen.

Where the gas is to be used in bleaching cellulosic material it may be preferred to make use of a mixture of chlorine dioxide and chlorine. In other instances it may be preferred to make use of chlorine dioxide substantially free from chlorine. The present invention may be used in either of these manners. Thus we are able to produce a gaseous mixture of chlorine dioxide and chlorine with the proportion between these two gases which is most desirable for a particular use. It is possible to reduce the chlorine evolved from the apparatus to substantially zero and thus to produce substantially pure chlorine dioxide diluted only with air or air and nitrogen. This is a particularly valuable feature of the present invention inasmuch as great flexibility is available by mere adjustment of the relative quantities of materials supplied to the apparatus.

In our copending application, Ser. No. 647,994, filed February 15, 1946, now Patent No. 2,481,241, we have disclosed and claimed a method for removing chlorine from a gaseous mixture of chlorine dioxide and chlorine by the use of $SO_2$ either in pure form or in the form available from a sulphur burner. The principles of the invention covered in said copending application may be applied to the present invention by supplying $SO_2$ to the packed column at such a rate that a small amount of $SO_2$ passes completely through the column and is carried over with the chlorine dioxide produced in the column.

Since under the conditions described herein the chlorine which is produced reacts with $SO_2$ in the presence of water vapor much more rapidly than does the chlorine dioxide, substantially all of the chlorine may be removed with but little loss of chlorine dioxide. The reactions just mentioned are set forth hereinbelow:

(3) $SO_2 + Cl_2 + 2H_2O \rightarrow 2HCl + H_2SO_4$
(4) $2ClO_2 + 5SO_2 + 6H_2O \rightarrow 5H_2SO_4 + 2HCl$ Referring now to Fig. 1 of the drawings in which is illustrated one embodiment of apparatus incorporating our invention, reference numeral 10 indicates a reaction tower or column which is packed with Raschig rings or other suitable packing material schematically indicated at 12. The reaction column 10 is provided with an inlet 14 at the bottom at a point below the support 16 for the column packing. The column 10 is provided with an inlet 18 and an outlet 20 at its upper end.

The column 10 is surrounded by a water jacket 22 having an inlet 24 at its upper end and outlet 26 at its lower end. It is believed apparent that forms of heat exchanging devices, other than the simple water jacket described above, may be employed if desirable. For example, independent water jackets (as shown in Fig. 3 of the drawings) may be employed where a reaction column of relatively small diameter is used and in such cases one of these jackets would be placed adjacent the zone of greatest reaction and used to cool the column in that zone, and another would be placed near the zone of efflux of spent liquor and used to heat that zone in order to prevent crystallization of the effluent liquor. On the other hand, whenever larger diameter reaction columns are used simple, externally-positioned water jackets would not be satisfactory because the distance between the cooling surface and the center of the tower would be too great for efficient cooling. In such cases one or more cooling tubes may be hung in the central portion of the column (as shown in Fig. 5 of the drawings) and it may be desirable to apply external heat to the bottom portion of the column in the zone of efflux of spent liquor either by suitable jacketing or by the direct injection of steam below the packing support grid.

At its extreme lower end the column 10 is provided with a valve 28 for withdrawal of accumulated liquids. This lower portion of the column may be inserted in a water bath 30 which maintains the effluent liquor at proper temperature to prevent crystallization thereof.

Concentrated sodium chlorate solution is conducted from a constant head bottle 32 by gravity flow through suitable glass, rubber or other tubing 34 to the inlet 18 in the reaction column 10. An adjustable valve 36 is located in the tube 34 for the purpose of establishing a desired rate of flow of sodium chlorate to the top of the column 10.

Sulphur dioxide is supplied to the inlet 14 at the bottom of column 10 in any suitable manner. For purposes of illustration pure sulphur dioxide may be supplied from a commercial bottle 38 under constant head as established by a bubbler 40, through a flow meter indicated at 42, through suitable tubing 44 into a mixing bottle 46. The rate of flow of sulphur dioxide may be controlled by suitable means such as an adjustable valve 48 located ahead of the flow meter 42.

Air is drawn through a flow meter 50 into the mixing bottle 46. The rate of flow of air is determined by suction on the system, and this in turn depends upon the adjustment of a valve 52 located at the top of an absorption column 54.

The apparatus just described supplies an adjustable flow of a mixture of sulphur dioxide and air in which the concentration of sulphur dioxide may be adjusted to suitable value by manipulation of the valve 48 with regard to the amount of suction on the system.

The mixture of sulphur dioxide and air is introduced to the reaction column through the inlet 14 at the lower end thereof. This gas thus flows through the column 10 countercurrently to the sodium chlorate solution supplied through the inlet 18. Specific Examples 1 to 5, inclusive, hereinbelow, are illustrative of countercurrent operation when practicing this invention. The gaseous mixture resulting from the reaction of the sulphur dioxide upon the sodium chlorate in the packed column will leave the same through the outlet 20 and it may be conducted through a tube 55 to an inlet 56 provided at the bottom of the absorption column 54.

The absorption column 54 may be very similar to the reaction column 10 except that it is not necessary to provide this column with a water jacket. Preferably it is packed with Raschig rings or other suitable packing material 58. At its upper end the absorption column 54 is provided with an inlet 60 through which water is introduced at a rate of flow determined by adjustment of a valve 62. The gas leaving the top of the absorption column is drawn through a tube 64 by action of a suitable vacuum pump 66 which exhausts to the atmosphere.

At its lowermost end the absorption column 54 is provided with a valve 68 from which the solution 70 may be withdrawn.

Suitable manometers 72, 74 and 76 may be provided to determine the pressure drop across the reaction column 10 and the absorption column 54.

While this embodiment illustrates a method of operation where the flow of gas is effected by suction, the same apparatus can be readily adapted to operation under pressure where the gases are blown through the apparatus.

A general description of the operation of our invention upon the illustrative apparatus just described will now be given.

The valve 36 is opened rather widely to cause the flow of a substantial quantity of sodium chlorate into the apparatus. When the column packing 12 has been thoroughly wetted the sulphur dioxide may be admitted to the apparatus. As described above, the gas thus admitted is a mixture of sulphur dioxide and air, or in other embodiments may comprise chiefly sulphur dioxide and nitrogen as in the product of sulphur burners. A concentration of sulphur dioxide not over twenty per cent (20%) by volume is advisable to obviate danger of explosion, and we have found that sulphur dioxide concentrations at least as low as 10% may be successfully employed. In any event, a suitably diluted sulphur dioxide mixture is introduced at the bottom of the reaction column 10. As this gas flows upwardly it will react with the sodium chlorate to produce chlorine dioxide and chlorine as described above. The rate of flow of sodium chlorate is then reduced to the desired rate and preferably this rate is such as to keep the packing thoroughly wetted without flooding. The rate of flow of the sulphur dioxide is then adjusted either (a) in accordance with visual observation of the location where greatest reaction occurs or (b) by measuring the temperature at various points in the column, the maximum temperature indicating where greatest reaction occurs, or (c) in accordance with analysis of effluent gas and liquor from the reaction column 10. The main reaction zone is indicated by a rather strong yellow color, and if it is desired to produce a mixture of chlorine dioxide and chlorine the flow of sulphur dioxide is so adjusted that the strongest yellow color is observed about midway of the height of the column and no yellow color is observed at or near the bottom of the packed portion thereof. Obviously, if it is desired to reduce the proportion of chlorine present it will be necessary to increase the rate of flow of sulphur dioxide as described above.

The higher the concentration of the sodium chlorate solution introduced at the top of the column the higher is the yield of chlorine dioxide per unit of weight of chlorate. However, if the solution is supplied to the column in too high a concentration the effluent solution becomes supersaturated with respect to sodium sulphate or sodium acid sulphate and crystallization may occur within the column. This tendency is enhanced by the cooling effect of the entering gas which evaporates water from the solution descending the column. This condition may be partially offset by saturating the sulphur dioxide gaseous mixture with water vapor, but we have discovered a novel way of offsetting this condition to such an extent that very high concentrations of sodium chlorate may be used, thus increasing the efficiency of this apparatus to a great extent.

The reaction between sodium chlorate and sulphur dioxide produces heat. The upper part of the reaction column 10, particularly the part in which the yellow color discussed above is the strongest, becomes quite hot. While we have observed that the temperature rise in this zone is not so great as to go beyond the limit to which chlorine dioxide gas of the concentration produced here may be safely handled, nevertheless this high temperature tends to reduce the efficiency of operation. In addition, as previously discussed, the tendency toward supersaturation of the effluent liquor requires that sodium chlorate solutions of less than optimum concentration be used. We have found that both of these deficiencies may be overcome by circulating water within the jacket 22 from the top of the column to the bottom thereof. This procedure enables us to cool the column in the zone of greatest reaction and to carry the heated cooling water downwardly whereby to heat the lower portion of the column in which added heat is of decided advantage for prevention of crystallization. This latter effect is due, of course, to the increase in solubility of sodium sulphate and sodium acid sulphate due to an increase in temperature.

Circulation of water within the jacket 22 may be effected by suitable tubing 78 and a pump 80 through which the water moves in the direction of the arrow 82. We have found that for commercial operation more heat is produced by the reaction than is needed to prevent crystallization at the bottom of the tower and thus a small heat exchanger 84 may be provided through which water is circulated at a suitable rate to maintain the temperature of the water in the column jacket at desired value.

It will be understood that the respective means for cooling the reaction zone and for heating the zone where crystallization may occur may be quite independent of each other. The heat-exchange combination which we have just described is, however, often desirable on the grounds of convenience and economy.

The mixture of gases leaving the top of the reaction column 10 through the outlet 20 is conducted through tube 55 into the inlet 56 of the absorption column 54. The gases are then drawn upwardly through the absorption column 54 countercurrently (as illustrated in Fig. 1) to the water introduced at the inlet 60 at the top of the absorption column.

The valve 62 is adjusted to establish desired rate of flow of water to the absorption column and it will be recognized that this rate is not particularly critical, it being necessary only to supply sufficient water to insure absorption of all of the gas and preferably to prevent flooding of the absorption column.

The aqueous solution 70 is withdrawn from the bottom of the absorption column 54 and may be conducted in any suitable manner to the point of use. One particular advantage of the method and apparatus disclosed herein lies in the fact that the aqueous solution 70 is discharged at a steady rate of flow proportioned to the flow of water into the top of the column, and thus a constant flow of the aqueous solution may be supplied to a processing operation requiring the same.

As discussed above, a constant supply of an aqueous solution containing a predetermined amount of chlorine dioxide is of particular value in a processing industry such as the preparation of dissolving pulp from a pulpwood source. In some instances with particular types of pulpwood and with particular objectives in view it may be desired to supply an aqueous solution containing a mixture of chlorine dioxide and chlorine, and our apparatus may be operated to establish such supply in accordance with the general discussion above and the specific examples herein below. In other instances it may be desired to reduce the relative amount of chlorine present in such aqueous solution or substantially to eliminate chlorine from such solution. These latter results may be achieved in accordance with our process and specific examples of such operation will be set forth herein below.

In certain other instances the use of aqueous solutions of the types above discussed may be undesirable, and in connection therewith our process and apparatus may be employed to produce a gaseous mixture containing chlorine dioxide substantially free from chlorine or containing a mixture of chlorine dioxide and selectively controlled amounts of chlorine, which gaseous mixture may be directly used in bleaching or other operations.

In Fig. 2 of the drawings there is illustrated a modified form of apparatus particularly suitable for the continuous generation of chlorine dioxide under conditions of cocurrent flow of the chlorate solution and the dilute sulphur dioxide. This apparatus is generally similar to that disclosed in Fig. 1 of the drawings and includes a reaction tower or column 86 which is packed with Raschig rings schematically indicated at 88. The reaction column 86 is provided with an inlet 90 at the top thereof for the introduction of dilute sulphur dioxide and a second inlet 92 located adjacent the inlet 90 and used to introduce the sodium chlorate solution. The bottom of the reaction column 86 is provided with an outlet 94 located below the grid support 96 for the column packing. The column 86 is surrounded by a water jacket 98 having an inlet 100 at its upper end and outlet 102 at its lower end.

At its extreme lower end the column 86 is provided with a valve 104 for withdrawal of accumulated liquids. This lower portion of the reaction column may be inserted in a water bath 106 to maintain the effluent liquor at proper temperature to prevent crystallization thereof. However, when the equipment is being operated continuously with cocurrent flow of the reactants we have found generally that the effluent liquor is warm enough to make such heating unnecessary. The water bath 106 then serves merely to prevent accidental crystallization during a period of interruption of operation.

Concentrated sodium chlorate solution is conducted from a constant head bottle 108 by gravity flow through suitable tubing 110 to the inlet 92 of the reaction column.

Sulphur dioxide is supplied to the inlet 90 at the top of the column 86 in any suitable manner. Again for the purposes of illustration pure sulphur dioxide may be supplied from a commercial bottle 112 under constant head as established by a bubbler 114 through a flow meter indicated at 116 through tubing 118 into a mixing bottle 120. The rate of flow of sulphur dioxide may be controlled by suitable means such as an adjustable valve 122 located ahead of the flow meter 116.

Air is drawn through a flow meter 124 into the mixing bottle 120.

This apparatus is similar to that illustrated in Fig. 1 of the drawings and supplies an adjustable flow of a mixture of sulphur dioxide and air in which the concentration of sulphur dioxide may be adjusted to suitable value by manipulation of the valve 122.

The mixture of sulphur dioxide and air is introduced to the reaction column 86 through the inlet 90 at the upper end thereof and flows through the column 86 cocurrently with respect to the sodium chlorate solution supplied through the inlet 92. Specific Examples 6 and 7 herein below are illustrative of cocurrent operation when practicing this invention. The gaseous mixture resulting from the reaction of the sulphur dioxide upon the sodium chlorate in the packed column will leave the same through the outlet 94 and may be conducted from that point to the bleach plant or other point of use.

As in the case of countercurrent operation cocurrent operation also causes the upper part of the column 86 to become quite hot. Proper cooling of the hot reaction zone may be effected by circulating water within the jacket 98.

Circulation of water within the jacket 98 may be effected by suitable tubing 126 and a pump 128 which moves the water in the direction indicated by the arrows at the inlet 100 and outlet 102. A small heat exchanger 130 may be provided through which water is circulated at a suitable rate to maintain the temperature of the water in the column jacket 98 at a desired value. By circulating water in this direction the coolest water comes in contact first with the hottest part of the reaction tower.

In Fig. 3 of the drawings there is illustrated a modification of the column jacketing means in which separately formed and operated jackets are provided. In this case the reaction column 10 (Fig. 1) is provided near its upper end with a jacket 132 through which cooling water may be circulated to keep the temperature level of the zone of greatest reaction at the most efficient operating point. The lower end of the column 10 may be provided with a jacket 134 through which heating water may be passed to raise the temperature of the lower end portion of the reaction column in order to prevent crystallization of the effluent liquids resulting from the generating process. It should be understood that if the extreme lower end of the reaction column needs to be warmed as well as the portion which is described above it will be only necessary to lower the position of the jacket 134 to span the zone over which the heat is to be applied. Obviously, separately positioned heating and cooling jackets of the type described above in connection with the countercurrent flow apparatus can have equal application to cocurrent flow apparatus of the type illustrated in Fig. 2 of the drawings to prevent accidental crystallization which may accompany interruptions of operation.

In Figs. 4 and 5 of the drawings there is illustrated another form of generating apparatus which is particularly adaptable for use in large scale installations where very substantial quantities of chlorine dioxide are required. Wherever generating apparatus is to be erected for small scale requirements of chlorine dioxide externally positioned heating and/or cooling jackets will serve adequately to control the temperatures in the various portions of the reaction column. However, when a large scale installation is to be made the diameter of the reaction column invariably will be so great that externally positioned water jackets cannot function efficiently since the heat transfer would be effective only near the outer portions of the column, and the central portion thereof would not be controlled. This would lead to pockets of intense reaction with high temperatures in the reaction zone and would also cause a decided drop in the over-all efficiency of the generating process. This invention provides a form of apparatus which is also suitable for large scale operations in which the cooling means are positioned internally within the reaction column so that the temperature conditions throughout the column can be properly controlled. To this end the large scale apparatus comprises a relatively large diameter reaction column 136 which may be formed from a plurality of sections of ceramic or other corrosion-resistant pipe and includes at its lower end a receiver portion 138 for containing and discharging the effluent liquors, and a supporting grid 140 which serves as the base for the Raschig rings 142 with which the column is packed. The upper end of the column 136 is closed by a disc-like element 144 suitably apertured to support a plurality of pipes through which the various materials are conducted. The top closure 144 supports an inlet pipe 146 through which the dilute sulphur dioxide is fed into the reaction column. The sodium chlorate solution is fed into the reaction column through a plurality of pipes 148 each of which is provided with a control valve 150 and has its lower end projecting slightly below the lower face of the closure element 144.

In order to cool the reaction column adequately a pair of U-shaped cooling tubes 152, 152 are supported by the closure element 144 and extend vertically downwardly through most of the length of the reaction column, and have their U bends terminate above the supporting grid 140. A rapid stream of cooling water is passed through each tube.

It has been found to be essential in the continuous generation of chlorine dioxide through apparatus of the type generally described above to take every precaution to assure that the Raschig rings with which the reaction column is packed have a substantially unbroken continuity of contact from the top of the column to the bottom thereof. It has been found that only by so preserving the continuity of contact of the column packing can the level of efficiency of the generating process (i. e., yield) be maintained at satisfactorily high levels, and also, it is only by providing such continuous packing of the column that accurate control over the generating process can be maintained. It is entirely possible that a helical cooling coil may be employed in place of the two U tubes above described since the provision of a helical coil still would not disrupt the over-all vertical continuity of the Raschig rings with which the column is packed. It should also be observed that by providing the internally positioned cooling means as above described the effective cooling radius will extend from the center axis of the reaction coulmn out to the outer casing of the column and in this manner will assure proper temperature control. It is obvious that the additional provision of external cooling means would further enhance the cooling efficiency, but we have not found that to be necessary in apparatus of the sizes we have constructed and operated to date.

Inasmuch as the effluent liquors drip down through the support grid 140 of the reaction column into the receiving chamber 138 there may be some possibility that a sufficiently great temperature drop would occur at that location to cause crystallization of the effluent liquors. In order to obviate this possibility a steam pipe 154 having a control valve 156 may be inserted into the receiving chamber 138 and the flow of steam therethrough appropriately adjusted to maintain the temperature of the effluent liquors sufficiently high that crystallization will not occur. However, when the apparatus is being operated continuously with cocurrent flow of the reactants we have found that the effluent liquor is warm enough to make such heating unnecessary. As explained above, in this method of operation the addition of heat at this location serves merely to prevent accidental crystallization during a period of interruption of operation.

In this large scale form of apparatus the drawings illustrate the manner in which the apparatus would be assembled for cocurrent operation of the generating process, and the evolved gases would be discharged from the bottom of the reaction column through a discharge pipe 158, and the liquors resulting from the process would be drained from the receiving chamber 138 through a discharge pipe 160. It is, of course, obvious that the gas discharge pipe 158 and the evolved liquor discharge pipe 160 could be provided with shut-off valves as desired.

In the event that large scale apparatus such as is illustrated in Figs. 4 and 5 of the drawings is to be operated under conditions of countercurrent flow it would only be necessary to use the discharge pipe 158 as a supply pipe for the diluted sulphur dioxide and to use the supply pipe 146 as the discharge pipe for the gases which would be evolved from the countercurrent flow operations.

The following specific examples have been selected as characteristic of operation of our apparatus in accordance with our process to achieve the various results discussed in general terms in the above description. It will be appreciated that since such examples are of illustrative nature the scope of our invention is not to be construed as limited to such specific examples and that modification and variations may be resorted to by those skilled in the art within the scope of the appended claims.

In the following examples we describe operation of our apparatus with an aqueous solution of sodium chlorate. Because of its solubility characteristics, commercial availability and relatively low cost sodium chlorate is preferred. However, any other chlorate which is sufficiently soluble in water may be adapted to our process without difficulty. Thus magnesium, lithium or aluminum chlorate are sufficiently soluble to lend themselves to use in our apparatus and process, while potassium chlorate is not sufficiently soluble to obtain a good yield of chlorine dioxide when the present cost of potassium chlorate is taken into consideration. It will be appreciated, however, that the selection of the most desirable chlorate for use in our process is largely a matter of a balance between cost and solubility and that changes in market condition may well render any of the chlorates discussed above highly desirable in our process. Calcium chlorate is sufficiently soluble for use in our process but calcium sulphate is insoluble and accordingly, if it were attempted to use calcium chlorate in our process the calcium sulphate produced in the reaction column would be expected to plug the column.

*Example 1.*—Aqueous sodium chlorate solution (690 grams per litre) was run into the reaction tower at the rate of 990 cc. per hour, while $SO_2$, diluted with air to 14.8% by volume concentration, was introduced countercurrently at the rate of 675 grams $SO_2$ per hour. Chlorine dioxide was produced at the rate of 282 grams per hour, a yield of 68.0% of the theoretical based on chlorate. The product contained chlorine dioxide and chlorine in the ratio of 93.3% chlorine dioxide to 6.7% chlorine by weight, or about 14:1.

*Example 2.*—Aqueous sodium chlorate solution (690 grams per litre) was run into the reaction tower at the rate of 675 cc. per hour, and $SO_2$, diluted with air to 15.4% by volume concentration, was introduced countercurrently at the rate of 490 grams $SO_2$ per hour. Chlorine dioxide was produced at the rate of 207 grams per hour, a yield of 73.3% of the theoretical based on chlorate. The product contained chlorine dioxide and chlorine in the ratio of 93.9% chlorine dioxide and 6.1% chlorine by weight, or 15.4:1.

*Example 3.*—Aqueous sodium chlorate solution (690 grams per litre) was run into the reaction tower at the rate of 527 cc. per hour, while $SO_2$, diluted with air to a concentration of 15.4% by volume, was introduced countercurrently at the rate of 354 grams $SO_2$ per hour. Chlorine dioxide was produced at the rate of 154 grams per hour, a yield of 69.3% of the theoretical based on chlorate. The reactive gases in the product contained chlorine dioxide and chlorine in the ratio of 92.0% chlorine dioxide to 8.0% chlorine by weight, or about 11.5:1.

*Example 4.*—Aqueous sodium chlorate solution (690 grams per litre) was run into the reaction tower at the rate of 880 cc. per hour, while $SO_2$, diluted with air to 14.8% by volume concentration, was introduced countercurrently at the rate of 675 grams $SO_2$ per hour. Chlorine dioxide was produced at the rate of 258 grams per hour, or 70.3% of the theoretical yield based on chlorate. Acid was carried over into the absorption tower at the rate of 154 grams per hour as sulphuric acid. The gaseous product contained at most only a trace of chlorine, about 1 part by weight to 330 parts of chlorine dioxide.

*Example 5.*—Aqueous sodium chlorate solution (690 grams per litre) was run in at the rate of 830 cc. per hour, while $SO_2$, diluted with air to 14.8% concentration, was introduced countercurrently at the rate of 675 grams $SO_2$ per hour. Chlorine dioxide substantially free from chlorine was produced at the rate of 211 grams per hour, a yield of 60.6% of the theoretical based on chlorate. Acid was produced at the rate of 194 grams per hour as sulphuric acid.

Example 1 illustrates operation of our apparatus with balanced amounts of chlorate and $SO_2$. Under such conditions the aqueous solution of gases contains some chlorine but very little acid. It will be noted that the ratio of chlorine dioxide to chlorine is 14:1 and that such ratio is very much higher than that achieved in the operation of processes and apparatus disclosed in the prior art. This example therefore illustrates the particular efficiency of our apparatus in achieving a high yield of chlorine dioxide with a relatively small quantity of chlorine.

In Examples 2 and 3 we illustrate operation of our apparatus at less than its full capacity, and it should be pointed out that even under such conditions there is very little change in the proportion of chlorine dioxide to chlorine. It is thus apparent that the production rate of our apparatus may be adjusted to suit a specific demand of a processing industry in which the apparatus is to be used without substantial loss in efficiency. This feature is particularly valuable in connection with a processing industry in which the bleaching or treating demands are likely to change from time to time.

Example 4 is illustrative of the operation of our apparatus with a slight excess of $SO_2$ in order to produce chlorine dioxide free from chlorine. The resulting aqueous solution contains a certain amount of acid, as indicated in the example, but in certain processing industries it may be preferred to make use of an aqueous solution containing such small amount of acid, but containing no chlorine, to the use of a solution relatively free of acid but containing some free chlorine.

In Example 5 the apparatus was operated with a large excess of $SO_2$. Such operation produces an aqueous solution of chlorine dioxide substantially free from chlorine, as in Example 4, but it will be noted that the yield is less due to the lowering of efficiency resulting from reaction between the excess $SO_2$ and the chlorine dioxide. The amount of acid contained in the aqueous solution is, as might be expected, larger than in the operation illustrated in Example 4. Examples 4 and 5 are thus illustrative of the flexibility of our apparatus and of the preferred operation when it is desired to produce chlorine dioxide substantially free from chlorine.

*Example 6.*—Aqueous sodium chlorate solution (695 grams sodium chlorate per litre of solution) was run into the reaction tower at the rate of 630 cc. per hour, while $SO_2$, diluted with air to 15% volume concentration, was introduced cocurrently at the rate of 480 grams $SO_2$ per hour. Chlorine dioxide was produced at the rate of 203 grams per hour, a yield of 76.7% of the theoretical based on chlorate. The product contained chlorine dioxide and chlorine in the ratio of 97.5% $ClO_2$ to 2.5% $Cl_2$ or 39:1.

*Example 7.*—Aqueous sodium chlorate solution (695 grams sodium chlorate per litre of solution) was run into the reaction tower at the rate of 564 cc. per hour, while $SO_2$, diluted with air to 10% volume concentration, was introduced cocurrently at the rate of 384 grams $SO_2$ per hour. Chlorine dioxide was produced at the rate of 178 grams per hour, a yield of 71.0% of the theoretical based on chlorate. The product contained chlorine dioxide and chlorine in the ratio of 89% chlorine dioxide and 11% chlorine or 8:1.

Examples 6 and 7 hereinabove are illustrative of the results that may be secured when this invention is practiced with cocurrent flow and it should be noted that in Example 6 the yield is particularly high. In Example 7 is illustrated the manner in which the process can be operated employing a lower concentration of $SO_2$ in the reaction column.

We claim:

1. A continuous process for the production of gaseous chlorine dioxide by the reaction between gaseous sulphur dioxide and an aqueous solution of a metallic chlorate, consisting in the steps of supplying a continuous stream of an aqueous solution of a metallic chlorate to a packed reaction column at such a rate as to distribute said aqueous chlorate solution over the surfaces of the packing in said reaction column, cocurrently supplying a continuous stream of gaseous sulphur dioxide and an inert diluent gas to said reaction column to bring said sulphur dioxide into contact with the surface of the aqueous chlorate solution distributed over the packing in said column, employing a heat exchanging medium to cool said packed column in the zone of greatest reaction, and continuously withdrawing from said reaction column a gaseous mixture containing chlorine dioxide and said inert diluent gas.

2. A continuous process for the production of gaseous chlorine dioxide by the reaction between gaseous sulphur dioxide and an aqueous solution of sodium chlorate, consisting in the steps of supplying a continuous stream of an aqueous solution of sodium chlorate to a packed reaction column at such a rate as to distribute said aqueous chlorate solution over the surfaces of the packing in said reaction column, cocurrently supplying a continuous stream of gaseous sulphur dioxide and an inert diluent gas to said reaction column to bring said sulphur dioxide into contact with the surface of the aqueous chlorate solution distributed over the packing in said column, employing a heat exchanging medium to cool said packed column in the zone of greatest reaction, and continuously withdrawing from said reaction column a gaseous mixture containing chlorine dioxide and said inert diluent gas.

3. A continuous process for the production of chlorine dioxide substantially free from chlorine by the reaction between gaseous sulphur dioxide and an aqueous solution of a metallic chlorate, consisting in the steps of continuously supplying an aqueous solution of a metallic chlorate to a packed reaction column in such a manner as to distribute a film of said aqueous chlorate solution on the surfaces of the packing in said reaction column, continuously and cocurrently supplying gaseous sulphur dioxide and an inert diluent gas to said reaction column to bring said sulphur dioxide into contact with the surface of the film of said aqueous chlorate solution, the quantity of sulphur dioxide thus introduced being greater than that which will react with said aqueous chlorate solution to produce chlorine dioxide and chlorine, and withdrawing continuously from said reaction column a gaseous mixture containing chlorine dioxide and said inert diluent gas and being substantially free from chlorine.

4. A continuous process for the production of gaseous chlorine dioxide by the reaction between gaseous sulphur dioxide and an aqueous solution of a metallic chlorate, consisting in the steps of supplying a continuous stream of an aqueous solution of a metallic chlorate to a packed reaction column at such a rate as to distribute said aqueous chlorate solution over the surfaces of the packing in said reaction column, cocurrently supplying a continuous stream of gaseous sulphur dioxide and an inert diluent gas to said reaction column to bring said sulphur dioxide into contact with the surface of the aqueous chlorate solution distributed over the packing in said column, cooling said packed column in the zone of greatest reaction, and continuously withdrawing from said column a gaseous mixture containing chlorine dioxide and said inert diluent gas.

5. A continuous process for the production of a mixture of chlorine dioxide and chlorine by the reaction between gaseous sulphur dioxide and an aqueous solution of a metallic chlorate, consisting in the steps of supplying a continuous stream of an aqueous solution of a metallic chlorate to a packed reaction column at such a rate as to distribute said aqueous chlorate solution over the surfaces of the packing in said reaction column, cocurrently supplying a continuous stream of gaseous sulphur dioxide and an inert diluent gas to said reaction column to bring said sulphur dioxide into contact with the surface of the aqueous chlorate solution distributed over the packing in said column, cooling said packed column in the zone of greatest reaction, and continuously withdrawing from said column a gaseous mixture containing chlorine dioxide, chlorine and said inert diluent gas.

MORRIS WAYMAN.
WILLIAM HOWARD RAPSON.

REFERENCES CITED

The following references are of record in the file of this patent:

UNITED STATES PATENTS

| Number | Name | Date |
|---|---|---|
| 809,086 | Blackmore | Jan. 2, 1906 |
| 1,294,546 | Sherwin | Feb. 18, 1919 |
| 1,510,790 | McElroy | Oct. 7, 1924 |
| 2,089,913 | Cunningham | Aug. 10, 1937 |
| 2,119,721 | Richardson | June 7, 1938 |
| 2,131,447 | Logan | Sept. 27, 1938 |
| 2,149,574 | Brown | Mar. 7, 1939 |
| 2,213,798 | Anne | Sept. 3, 1940 |
| 2,366,309 | Batchelder | Jan. 2, 1945 |
| 2,373,830 | Holst | Apr. 17, 1945 |